(12) United States Patent  
Yang et al.

(10) Patent No.: US 10,382,737 B2  
(45) Date of Patent: Aug. 13, 2019

(54) IMAGE PROCESSING METHOD AND APPARATUS

(71) Applicant: Huawei Technologies Co., Ltd., Shenzhen (CN)

(72) Inventors: Xiaowei Yang, Hangzhou (CN); Guofeng Zhang, Hangzhou (CN); Yi He, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 15/642,171

(22) Filed: Jul. 5, 2017

(65) Prior Publication Data

US 2017/0302901 A1    Oct. 19, 2017

Related U.S. Application Data

(63) Continuation of application No. PCT/CN2016/070116, filed on Jan. 5, 2016.

(30) Foreign Application Priority Data

Jan. 6, 2015   (CN) .......................... 2015 1 0005026

(51) Int. Cl.
*H04N 13/117* (2018.01)
*H04N 13/00* (2018.01)
(Continued)

(52) U.S. Cl.
CPC ........... *H04N 13/117* (2018.05); *G06T 5/005* (2013.01); *G06T 5/50* (2013.01); *G06T 7/20* (2013.01);
(Continued)

(58) Field of Classification Search
CPC ....... G06T 7/0069; G06T 7/751; G06T 7/579; G06T 7/50; G06T 5/005; G06T 5/50;
(Continued)

(56) References Cited

U.S. PATENT DOCUMENTS

2003/0235344 A1    12/2003  Kang et al.
2007/0126749 A1*   6/2007   Tzruya ................... A63F 13/12
                                                        345/581
(Continued)

FOREIGN PATENT DOCUMENTS

CN        101710932 A        5/2010
CN        101742349 A        6/2010
(Continued)

OTHER PUBLICATIONS

Gaurav Chaurasia et al., "Depth Synthesis and Local Warps for Plausible Image-based Navigation", ACM Transactions on Graphics, vol. 32, No. 3, Article 30, Jun. 2013, 12 pages.

(Continued)

*Primary Examiner* — Duy M Dang
(74) *Attorney, Agent, or Firm* — Slater Matsil, LLP

(57) ABSTRACT

An image processing method includes obtaining multiple video frames, where the multiple video frames are collected from a same scene at different angles and determining a depth map of each video frame according to corresponding pixels among the multiple video frames; supplementing background missing regions of the multiple video frames according to depth maps of the multiple video frames, to obtain supplemented video frames of the multiple video frames and depth maps of the multiple supplemented video frames. The method also includes generating an alpha image of each video frame according to an occlusion relationship between each of the multiple video frames and a supplemented video frame of each video frame in a background missing region and generating a browsing frame at a specified browsing angle according to the multiple video frames, the supplemented video frames of the multiple video frames, and alpha images of the multiple video frames.

20 Claims, 3 Drawing Sheets

(51) Int. Cl.

| | | |
|---|---|---|
| *G06T 7/50* | (2017.01) | |
| *G06T 7/20* | (2017.01) | |
| *G06T 5/00* | (2006.01) | |
| *G06T 5/50* | (2006.01) | |
| *H04N 19/00* | (2014.01) | |
| *H04N 19/553* | (2014.01) | |
| *G06T 7/579* | (2017.01) | |

(52) U.S. Cl.
CPC ............... *G06T 7/50* (2017.01); *G06T 7/579* (2017.01); *H04N 13/00* (2013.01); *H04N 19/00* (2013.01); *H04N 19/553* (2014.11); *G06T 2207/10028* (2013.01); *G06T 2207/20221* (2013.01); *H04N 2213/005* (2013.01)

(58) Field of Classification Search
CPC ...... G06T 7/20; H04N 13/117; H04N 19/553; H04N 13/00; H04N 19/00
See application file for complete search history.

(56) References Cited

U.S. PATENT DOCUMENTS

| | | |
|---|---|---|
| 2011/0293192 A1 | 12/2011 | Ichihashi |
| 2012/0169722 A1 | 7/2012 | Hwang et al. |
| 2012/0274739 A1 | 11/2012 | Li |
| 2012/0313932 A1 | 12/2012 | Hwang et al. |
| 2013/0162764 A1 | 6/2013 | Masuda |
| 2014/0085433 A1 | 3/2014 | Han et al. |
| 2014/0098100 A1 | 4/2014 | Dane et al. |
| 2015/0221126 A1 | 8/2015 | Liu et al. |

FOREIGN PATENT DOCUMENTS

| | | |
|---|---|---|
| CN | 101789124 A | 7/2010 |
| CN | 102298777 A | 12/2011 |
| CN | 102325259 A | 1/2012 |
| CN | 102663772 A | 9/2012 |
| CN | 103098478 A | 5/2013 |
| CN | 103279961 A | 9/2013 |
| CN | 104159093 A | 11/2014 |
| CN | 104574311 A | 4/2015 |
| KR | 20120078924 A | 7/2012 |
| KR | 20130061878 A | 6/2013 |

OTHER PUBLICATIONS

Gaurav Chaurasia et al., "Silhouette-Aware Warping for Image-Based Rendering", Eurographics Symposium on Rendering 2011, vol. 30, No. 4, 10 pages.

Pedro F. Felzenszwalb et al., "Efficient Graph-Based Image Segmentation", International Journal of Computer Vision, vol. 59, Issue 2, 2004, 26 pages.

Vivek Kwatra et al., "Graphcut Textures: Image and Video Synthesis Using Graph Cuts", GVU Center/College of Computing, Georgia Institute of Technology, Jul. 2003, 10 pages.

Patrick Perez et al., "Poisson Image Editing", ACM, 2003, 6 pages.

Heung-Yeung Shum et al., "A Review of Image-based Rendering Techniques", VCIP, 2000, 12 pages.

Qingxiong Yang, "A Non-Local Cost Aggregation Method for Stereo Matching", IEEE, 2012, pp. 1402-1409.

Guofeng Zhang et al., "Consistent Depth Maps Recovery from a Video Sequence", IEEE Transactions on Pattern Analysis and Machine Intelligence, vol. 31, No. 6, Jun. 2009, pp. 974-988.

\* cited by examiner

IMAGE PROCESSING METHOD AND APPARATUS

CROSS-REFERENCE TO RELATED APPLICATIONS

This application is a continuation of International Application No. PCT/CN2016/070116, filed on Jan. 5, 2016, which claims priority to Chinese Patent Application No. 201510005026.X, filed on Jan. 6, 2015. The disclosures of the aforementioned applications are hereby incorporated by reference in their entireties.

TECHNICAL FIELD

Embodiments of the present invention relate to the image processing field, and more specifically, to an image processing method and apparatus.

BACKGROUND

A stereo photography technology is a great improvement in conventional video image collection, aiming at presenting a three-dimensional browsing effect with a series of processing on a two-dimensional image sequence obtained during image collection. Therefore, an image collection result is more than a video. In addition to watching a target object passively at an image collection angle, people may further adjust a view angle actively, to watch from different directions.

Usually, a structure from motion technology may be used to recover camera parameters corresponding to each image. The camera parameters include an intrinsic matrix K and motion parameters [R|T] of a camera. R is a 3×3 rotation matrix, indicating an orientation of the camera. T is a three-dimensional translation vector, indicating translation of the camera in a scene. Any three-dimensional point X in the scene may be projected to a point x in the image by using the camera parameters:

$$\hat{x}=K(RX+T)$$

$\hat{x}$ is a homogenous coordinate system of the two-dimensional point x, that is, $\hat{x}=(x\ 1)^T$. Such a projection relationship is represented by a projection function $\pi$:

$$x=\pi(K,R,T,X).$$

If there are sufficient common points in different images, both camera parameters corresponding to each frame of image and three-dimensional positions of all scene points may be recovered by minimizing an energy function:

$$\underset{K_i,R_i,T_i,X_j}{\operatorname{argmin}} \sum_i \sum_j v_{ij}\|x_{ij} - \pi(K_i, R_i, T_i, X_j)\|^2.$$

$(K_i,R_i,T_i)$ are camera parameters of an $i^{th}$ frame, and $X_j$ is a position of a $j^{th}$ three-dimensional point. If the $j^{th}$ three-dimensional point is visible in the $i^{th}$ frame, $v_{ij}=1$. $x_{ij}$ is a position of the $j^{th}$ three-dimensional point in the $i^{th}$ frame. Otherwise, $v_{ij}=0$.

The algorithm requires feature points to be automatically extracted from images, and requires a match between image feature points that are in different images and that correspond to a same scene point. Specifically, an SIFT (scale-invariant feature transform) feature point is extracted from each image, and a 64-dimensional vector, referred to as a feature description vector, is calculated for each SIFT feature point. The feature description vector includes image information of surroundings of a feature point. In different images, feature description vectors corresponding to a same scene point are proximate. Therefore, a Euclidean distance between feature description vectors may be calculated to implement the match between image feature points that are in different images and that correspond to a same scene point. In addition, a match point between every two images needs to satisfy an epipolar geometry constraint. Therefore, a mismatch may be removed based on the constraint by using an RANSAC (random sample consensus) method.

Subsequently, according to a feature matching result, a progressive structure from motion technology is used to recover motion parameters corresponding to each image and positions of sparse three-dimensional points in the scene. For example, a system selects an image pair having a relatively large quantity of common points and a relatively long base line, estimates relative positions of cameras of the two frames of images by using a five-point method, and estimates three-dimensional positions of the common points of the two frames by using a triangulation algorithm. For remaining frame of images, if sufficient three-dimensional points whose positions are recovered are visible in a frame, camera parameters corresponding to the frame are estimated by using an efficient perspective-n-point (EPnP) algorithm, and three-dimensional points whose positions are unrecovered in the frame of image are added to the scene by using the triangulation algorithm. This step is iterated until all frames are processed. To eliminate error accumulation, after iteration is performed each time, a bundle adjustment technique may be used to jointly optimize all recovered camera parameters and three-dimensional point clouds.

The prior art provides a stereo photography technology. First, camera parameters and three-dimensional points in a scene are recovered by using the structure from motion technology, and an image whose camera parameters are proximate to those of a browsing viewpoint is selected as a source image. Subsequently, a network is created for the source image according to the three-dimensional points in the scene, and a texture mapping relationship is established according to projections of the three-dimensional points on the source image. Rendering is performed based on multiple frames of source images, and alpha blending is performed according to an angle relationship. Finally, a missing region is supplemented.

A lower portion of region at a view angle may be occluded and invisible in a photographing situation. If supplementation is performed after a final projection result is obtained in a real-time rendering phase, display efficiency is substantially affected, and fluency of real-time rendering is substantially reduced.

SUMMARY

Embodiments of the present invention provide an image processing method and apparatus, to improve a speed in image browsing with integrity of a browsed image ensured.

According to a first aspect, a method is provided, where the method includes: obtaining multiple video frames, where the multiple video frames are collected from a same scene at different angles; determining a depth map of each video frame according to corresponding pixels among the multiple video frames; supplementing background missing regions of the multiple video frames according to depth maps of the multiple video frames, to obtain supplemented video frames of the multiple video frames and depth maps of the multiple supplemented video frames; generating an alpha image of each video frame according to an occlusion relationship between each of the multiple video frames and a supplemented video frame of each video frame in a background missing region; and generating a browsing frame at a specified browsing angle according to the multiple video frames, the supplemented video frames of the multiple video frames, and alpha images of the multiple video frames.

With reference to the first aspect, in a first possible implementation of the first aspect, the generating a browsing frame at a specified browsing angle according to the multiple video frames, the supplemented video frames of the multiple video frames, and alpha images of the multiple video frames includes: obtaining position relationships between the browsing angle and collection angles of the multiple video frames; selecting a target video frame from the multiple video frames according to the position relationships; mapping pixels in the target video frame and a supplemented video frame of the target video frame to the browsing angle; and blending, by using an alpha image of the target video frame, the pixels mapped to the browsing angle, to generate the browsing frame.

With reference to the first possible implementation of the first aspect, in a second possible implementation of the first aspect, the selecting a target video frame from the multiple video frames according to the position relationships includes: selecting the target video frame from the multiple video frames according to the position relationships, where in the multiple video frames, a difference between a collection angle of the target video frame and the browsing angle is minimum.

With reference to the first aspect, or the first or the second possible implementation of the first aspect, in a third possible implementation of the first aspect, the supplementing background missing regions of the multiple video frames according to depth maps of the multiple video frames, to obtain supplemented video frames of the multiple video frames and depth maps of the multiple supplemented video frames includes: determining a to-be-supplemented frame from the multiple video frames and multiple projected frames of the to-be-supplemented frame, where the to-be-supplemented frame is any one of the multiple video frames, and the multiple projected frames include a background missing region in the to-be-supplemented frame; determining a pixel mapping relationship between a depth map of the to-be-supplemented frame and a depth map of each projected frame; and supplementing the to-be-supplemented frame according to multiple pixel mapping relationships by using the multiple projected frames, to obtain a supplemented frame and a depth map of the supplemented frame, where a first pixel in the to-be-supplemented frame corresponds to a second pixel in each projected frame, and when a depth difference between the first pixel and the second pixel is greater than a preset threshold, setting pixels in the supplemented frame to a color channel value and a depth channel value of the second pixel, or when a depth difference between the first pixel and the second pixel is not greater than a preset threshold, setting pixels in the supplemented frame to a color channel value and a depth channel value of the first pixel, where corresponding pixels between the depth map of the supplemented frame and the supplemented frame have a same depth channel value.

With reference to any one of the first aspect, or the first to third possible implementations of the first aspect, in a fourth possible implementation of the first aspect, after the generating an alpha image of each video frame according to an occlusion relationship between each of the multiple video frames and a supplemented video frame of each video frame in a background missing region, the method further includes: performing, according to a boundary of a supplemented region indicated by the occlusion relationship, Gaussian blur by setting an alpha channel value that is greater than 0 and less than 1.

With reference to the fourth possible implementation of the first aspect, in a fifth possible implementation of the first aspect, the method further includes: determining a first pixel window in the target video frame, where the first pixel window includes a target pixel, and a width of the first pixel window is greater than a width of two pixels; determining, in multiple pixels in the first pixel window, whether each of the multiple pixels is a foreground pixel or a background pixel, where a depth of the foreground pixel is less than a depth of the background pixel; when a pixel in the multiple pixels that is the foreground pixel is not in the supplemented region, determining the pixel as a pixel in an extended supplemented region, where the extended supplemented region includes the supplemented region; and performing, according to the boundary of the supplemented region indicated by the occlusion relationship, Gaussian blur on the target video frame by setting the alpha channel value that is greater than 0 and less than 1 includes: performing Gaussian blur on a boundary of the extended supplemented region by setting the alpha channel value that is greater than 0 and less than 1.

With reference to the fifth possible implementation of the first aspect, in a sixth possible implementation of the first aspect, the determining, in multiple pixels in the first pixel window, whether each of the multiple pixels is a foreground pixel or a background pixel includes: determining a depth difference between each pixel and the target pixel, to obtain multiple depth differences corresponding to the multiple pixels; sorting the multiple depth differences in ascending order or descending order; determining a depth difference at a position with a maximum increase according to an increase between two adjacent depth differences in a sequence; determining a pixel corresponding to the depth difference at the position with the maximum increase, as a critical pixel between the foreground pixel and the background pixel; and determining whether each pixel is the foreground pixel or the background pixel, where a depth difference corresponding to the foreground pixel is less than a depth difference corresponding to the critical pixel, and a depth difference corresponding to the background pixel is greater than the depth difference corresponding to the critical pixel.

With reference to any one of the first aspect, or the first to the sixth possible implementations of the first aspect, in a seventh possible implementation of the first aspect, after the obtaining multiple video frames, the method further includes: determining multiple corresponding initial feature pixels in the multiple video frames, where the multiple initial feature pixels are determined according to pixel intensity gradients of the multiple video frames; determining multiple final feature pixels in the multiple initial feature pixels according to a constraint condition, where the constraint condition is that in each video frame, there is a feature pixel in any second pixel window, and a width of the second pixel window is greater than a width of one pixel; and the determining a depth map of each video frame according to corresponding pixels among the multiple video frames includes: determining camera parameters corresponding to each video frame and position information of the multiple final feature pixels according to the multiple final feature pixels; determining depths of multiple final feature pixels in each video frame according to the position information of the multiple final feature pixels and the camera parameters corresponding to each video frame; determining, according to the depths of the multiple final feature pixels in each video frame, a dense depth map of each video frame by means of pixel similarity calculation; performing plane fitting processing on the dense depth map of each video frame; and performing time-space coherence processing on multiple dense depth maps on which the plane fitting processing has been performed, to obtain the multiple depth maps of the multiple video frames.

With reference to any one of the first aspect, or the first to the seventh possible implementations of the first aspect, in an eighth possible implementation of the first aspect, before the determining a depth map of each video frame according to corresponding pixels among the multiple video frames, the method further includes: determining the corresponding pixels among the multiple video frames; determining the camera parameters of each video frame according to the corresponding pixels; creating a spherical coordinate system according to the camera parameters of each video frame and position information of the corresponding pixels among the multiple video frames; obtaining position information of a browsing viewpoint on a surface of a sphere centering on an origin of the spherical coordinate system; and determining the specified browsing angle according to the position information of the browsing viewpoint.

According to a second aspect, an apparatus is provided, where the apparatus includes: a first obtaining module, configured to obtain multiple video frames, where the multiple video frames are collected from a same scene at different angles; a first determining module, configured to determine a depth map of each video frame according to corresponding pixels among the multiple video frames; a supplementation module, configured to supplement background missing regions of the multiple video frames according to depth maps of the multiple video frames, to obtain supplemented video frames of the multiple video frames and depth maps of the multiple supplemented video frames; a first generation module, configured to generate an alpha image of each video frame according to an occlusion relationship between each of the multiple video frames and a supplemented video frame of each video frame in a background missing region; and a second generation module, configured to generate a browsing frame at a specified browsing angle according to the multiple video frames, the supplemented video frames of the multiple video frames, and alpha images of the multiple video frames.

With reference to the second aspect, in a first possible implementation of the second aspect, the second generation module is specifically configured to: obtain position relationships between the browsing angle and collection angles of the multiple video frames; select a target video frame from the multiple video frames according to the position relationships; map pixels in the target video frame and a supplemented video frame of the target video frame to the browsing angle; and blend, by using an alpha image of the target video frame, the pixels mapped to the browsing angle, to generate the browsing frame.

With reference to the first possible implementation of the second aspect, in a second possible implementation of the second aspect, the second generation module is specifically configured to select the target video frame from the multiple video frames according to the position relationships, where in the multiple video frames, a difference between a collection angle of the target video frame and the browsing angle is minimum.

With reference to the second aspect the first or the second possible implementation of the second aspect, in a third possible implementation of the second aspect, the supplementation module is specifically configured to: determine a to-be-supplemented frame from the multiple video frames and multiple projected frames of the to-be-supplemented frame, where the to-be-supplemented frame is any one of the multiple video frames, and the multiple projected frames include a background missing region in the to-be-supplemented frame; determine a pixel mapping relationship between a depth map of the to-be-supplemented frame and a depth map of each projected frame; and supplement the to-be-supplemented frame according to multiple pixel mapping relationships by using the multiple projected frames, to obtain a supplemented frame and a depth map of the supplemented frame, where a first pixel in the to-be-supplemented frame corresponds to a second pixel in each projected frame, and when a depth difference between the first pixel and the second pixel is greater than a preset threshold, set pixels in the supplemented frame to a color channel value and a depth channel value of the second pixel, or when a depth difference between the first pixel and the second pixel is not greater than a preset threshold, set pixels in the supplemented frame to a color channel value and a depth channel value of the first pixel, where corresponding pixels between the depth map of the supplemented frame and the supplemented frame have a same depth channel value.

With reference to any one of the second aspect, or the first to the third possible implementations of the second aspect, in a fourth possible implementation of the second aspect, the apparatus further includes: a Gaussian blur module, configured to: after the alpha image of each video frame is generated according to the occlusion relationship between each of the multiple video frames and the supplemented video frame of each video frame in the background missing region, perform, according to a boundary of a supplemented region indicated by the occlusion relationship, Gaussian blur by setting an alpha channel value that is greater than 0 and less than 1.

With reference to the fourth possible implementation of the second aspect, in a fifth possible implementation of the second aspect, the apparatus further includes: a second determining module, configured to determine a first pixel window in the target video frame, where the first pixel window includes a target pixel, and a width of the first pixel window is greater than a width of two pixels; and a third determining module, configured to: determine, in multiple pixels in the first pixel window, whether each of the multiple pixels is a foreground pixel or a background pixel, where a depth of the foreground pixel is less than a depth of the background pixel; and when a pixel in the multiple pixels that is the foreground pixel is not in the supplemented region, determine the pixel as a pixel in an extended supplemented region, where the extended supplemented region includes the supplemented region, where the Gaussian blur module is specifically configured to perform Gaussian blur on a boundary of the extended supplemented region by setting the alpha channel value that is greater than 0 and less than 1.

With reference to the fifth possible implementation of the second aspect, in a sixth possible implementation of the second aspect, the third determining module is specifically configured to: determine a depth difference between each pixel and the target pixel, to obtain multiple depth differences corresponding to the multiple pixels; sort the multiple depth differences in ascending order or descending order; determine a depth difference at a position with a maximum increase according to an increase between two adjacent depth differences in a sequence; determine a pixel corresponding to the depth difference at the position with the maximum increase, as a critical pixel between the foreground pixel and the background pixel; and determine whether each pixel is the foreground pixel or the background pixel, where a depth difference corresponding to the foreground pixel is less than a depth difference corresponding to the critical pixel, and a depth difference corresponding to the background pixel is greater than the depth difference corresponding to the critical pixel.

With reference to any one of the second aspect, or the first to the sixth possible implementations of the second aspect, in a seventh possible implementation of the second aspect, the apparatus further includes: a fourth determining module, configured to: after the multiple video frames are obtained, determine multiple corresponding initial feature pixels in the multiple video frames, where the multiple initial feature pixels are determined according to pixel intensity gradients of the multiple video frames; and a fifth determining module, configured to determine multiple final feature pixels in the multiple initial feature pixels according to a constraint condition, where the constraint condition is that in each video frame, there is a feature pixel in any second pixel window, and a width of the second pixel window is greater than a width of one pixel, where the first determining module is specifically configured to: determine camera parameters corresponding to each video frame and position information of the multiple final feature pixels according to the multiple final feature pixels; determine depths of multiple final feature pixels in each video frame according to the position information of the multiple final feature pixels and the camera parameters corresponding to each video frame; determine, according to the depths of the multiple final feature pixels in each video frame, a dense depth map of each video frame by means of pixel similarity calculation; perform plane fitting processing on the dense depth map of each video frame; and perform time-space coherence processing on multiple dense depth maps on which the plane fitting processing has been performed, to obtain the multiple depth maps of the multiple video frames.

With reference to any one of the second aspect, or the first to the seventh possible implementations of the second aspect, in an eighth possible implementation of the second aspect, the apparatus further includes: a sixth determining module, configured to: before the depth map of each video frame is determined according to the corresponding pixels among the multiple video frames, determine the corresponding pixels among the multiple video frames; a seventh determining module, configured to determine the camera parameters of each video frame according to the corresponding pixels; a creation module, configured to create a spherical coordinate system according to the camera parameters of each video frame and position information of the corresponding pixels among the multiple video frames; a second obtaining module, configured to obtain position information of a browsing viewpoint on a surface of a sphere centering on an origin of the spherical coordinate system; and an eighth determining module, configured to determine the specified browsing angle according to the position information of the browsing viewpoint.

According to the embodiments of the present invention, a background missing region of a video frame can be supplemented, and then a browsing frame at a specified browsing angle is generated according to a supplemented video frame. Because the video frame image is supplemented before the browsing frame is generated, a speed in image browsing is improved with integrity of a browsed image ensured.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present embodiments.

Figure 1:
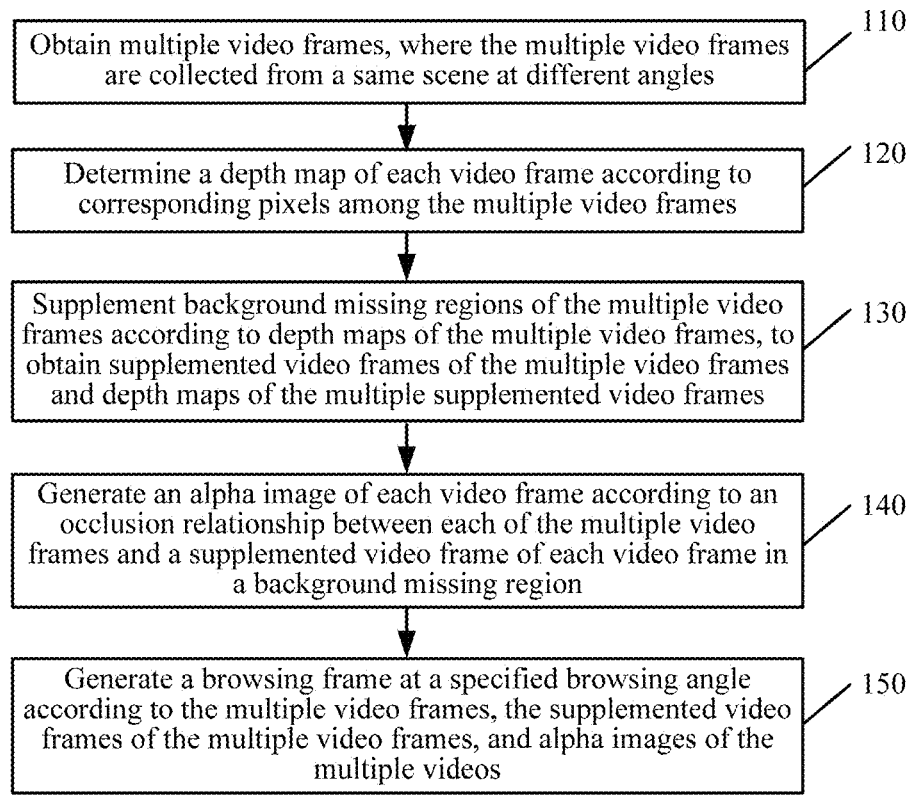
FIG. 1 is a schematic flowchart of an image processing method according to an embodiment of the present invention.

FIG. 1 is a schematic flowchart of an image processing method 100 according to an embodiment of the present invention. The method 100 in FIG. 1 is performed by an image processing apparatus and includes the following steps.

110: Obtain multiple video frames, where the multiple video frames are collected from a same scene at different angles.

120: Determine a depth map of each video frame according to corresponding pixels among the multiple video frames.

130: Supplement background missing regions of the multiple video frames according to depth maps of the multiple video frames, to obtain supplemented video frames of the multiple video frames and depth maps of the multiple supplemented video frames.

140: Generate an alpha image of each video frame according to an occlusion relationship between each of the multiple video frames and a supplemented video frame of each video frame in a background missing region.

150: Generate a browsing frame at a specified browsing angle according to the multiple video frames, the supplemented video frames of the multiple video frames, and alpha images of the multiple video frames.

It should be understood that the image processing method provided in this embodiment of the present invention may be applied to two-dimensional to three-dimensional conversion, image and video supplementation, and other fields. The corresponding pixels among the multiple video frames may be multiple feature pixels that are in each video frame and that correspond to multiple feature points in a world coordinate system. There are mapping relationships between multiple feature pixels in one of the multiple video frames and multiple feature pixels in any one of the other multiple video frames. The multiple feature points may be determined based on scale-invariant feature transform (SIFT) or in another manner, or may be other corresponding pixels that can be used to establish relationships between some pixels in one of the multiple video frames and some pixels in any one of the other multiple video frames. This is not limited in the present embodiments. It should further be understood that an alpha channel value that is set according to a result of supplementation processing may be an alpha channel value that is set according to a supplemented portion. For example, the alpha channel value is set to 1 for a portion that is a video frame and that corresponds to the supplemented portion, and the alpha channel value is set to 0 for the other portion of the video frame. Alternatively, the alpha channel value is set between 0 and 1 for a boundary of the supplemented portion.

According to this embodiment of the present invention, a background missing region of a video frame can be supplemented, and then a browsing frame at a specified browsing angle is generated according to a supplemented video frame. Because the video frame image is supplemented before the browsing frame is generated, a speed in image browsing is improved with integrity of a browsed image ensured.

According to this embodiment of the present invention, the generating a browsing frame at a specified browsing angle according to the multiple video frames, the supplemented video frames of the multiple video frames, and alpha images of the multiple video frames includes: obtaining position relationships between the browsing angle and collection angles of the multiple video frames; selecting a target video frame from the multiple video frames according to the position relationships; mapping pixels in the target video frame and a supplemented video frame of the target video frame to the browsing angle; and blending, by using an alpha image of the target video frame, the pixels mapped to the browsing angle, to generate the browsing frame.

It should be understood that the obtained position relationships between the browsing angle and the collection angles of the multiple video frames may be relationships between camera parameters corresponding to the browsing angle and camera parameters corresponding to the collection angles. Different video frames have different collection angles. The camera parameters may be obtained by using the corresponding pixels among the multiple video frames. The camera parameters may include a camera intrinsic parameter and a camera extrinsic parameter that is applied during video frame collection. The position relationships in this specification may be three-dimensional position relationships of all pixels, or may be three-dimensional position relationships of pixels in the supplemented portion. Position mapping relationships between three-dimensional networks are established based on some pixels. The mapping relationships include a position mapping relationship between the target video frame and the browsing frame, and a position mapping relationship between the supplemented video frame of the target video frame and the browsing frame. A position mapping relationship between the alpha image and the browsing frame is the same as the position mapping relationship between the target video frame and the browsing frame. The pixels mapped to the browsing angle are blended by using the alpha image of the target video frame, to generate the browsing frame. A color channel value, a depth channel value, and the like of each pixel in the browsing frame may be set according to the position mapping relationships. Because the browsing frame is generated according to the position relationships between the browsing angle and the collection angles of the multiple video frames, mapping based on a limited angle ensures a relatively good effect, and avoids image blurring or distortion or the like caused in a mapping process.

According to this embodiment of the present invention, the selecting a target video frame from the multiple video frames according to the position relationships includes: selecting the target video frame from the multiple video frames according to the position relationships, where in the multiple video frames, a difference between a collection angle of the target video frame and the browsing angle is minimum.

For example, the angle difference may be determined by using the camera parameters corresponding to the browsing angle and the camera parameters corresponding to the collection angles. The minimum difference between the browsing angle and the collection angle of the video frame can ensure image clarity when the browsing frame is generated.

According to this embodiment of the present invention, the supplementing background missing regions of the multiple video frames according to depth maps of the multiple video frames, to obtain supplemented video frames of the multiple video frames and depth maps of the multiple supplemented video frames includes: determining a to-be-supplemented frame from the multiple video frames and multiple projected frames of the to-be-supplemented frame, where the to-be-supplemented frame is any one of the multiple video frames, and the multiple projected frames include a background missing region in the to-be-supplemented frame; determining a pixel mapping relationship between a depth map of the to-be-supplemented frame and a depth map of each projected frame; and supplementing the to-be-supplemented frame according to multiple pixel mapping relationships by using the multiple projected frames, to obtain a supplemented frame and a depth map of the supplemented frame, where a first pixel in the to-be-supplemented frame corresponds to a second pixel in each projected frame, and when a depth difference between the first pixel and the second pixel is greater than a preset threshold, setting pixels in the supplemented frame to a color channel value and a depth channel value of the second pixel, or when a depth difference between the first pixel and the second pixel is not greater than a preset threshold, setting pixels in the supplemented frame to a color channel value and a depth channel value of the first pixel, where corresponding pixels between the depth map of the supplemented frame and the supplemented frame have a same depth channel value.

It should be understood that the multiple supplemented video frames of the multiple video frames may be determined by means of iteration. For example, frame number differences between the multiple projected frames and the to-be-supplemented frame are greater than 1. In an embodiment, the frame number differences are 10. When iteration is performed, the to-be-supplemented frame may be supplemented by using the multiple projected frames, and then a supplemented frame obtained after supplementation is used as a projected frame for supplementing another frame in the multiple projected frames. Alternatively, the to-be-supplemented frame is iteratively supplemented by using the multiple projected frames. In other words, iterative supplementation may be performed between the multiple projected frames, and then an intermediate supplementation result during iteration may be used as a projected frame for supplementing the to-be-supplemented frame. A specific manner of iteration is not limited in this embodiment of the present invention. Because the depth-based threshold is preset, concise supplementation processing may be performed based on the depth map, thereby effectively improving calculation efficiency.

It should further be understood that the multiple video frames may be obtained according to a collection angle range of a camera. The collection angles of the multiple video frames fall within the collection angle range. In this way, only multiple video frames satisfying the range need to be supplemented, thereby reducing the amount of calculation when supplementation is performed.

Figure 2:
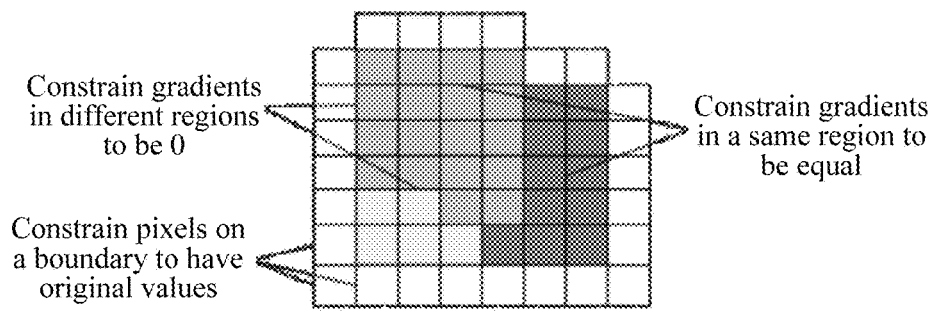
FIG. 2 is a schematic diagram of a color correction method according to another embodiment of the present invention.

Optionally, in another embodiment, the method further includes: performing color correction on each of the multiple supplemented video frames. It should be understood that due to a change in luminance, there is a color difference between a projection region result and a non-projected region, and there is a color difference between projection results obtained based on different projection sources. Therefore, a visual gap is caused, and color correction needs to be performed. FIG. 2 is a schematic diagram of a color correction method according to another embodiment of the present invention. For example, color correction is performed on projection results by using a Poisson image editing (Poisson image editing) method. In FIG. 2, pixels in different regions satisfy a particular constraint condition. For example, pixels on a boundary have original values and remain unchanged, gradients in different regions are 0, and gradients in a same region are equal. The different regions are from different projected frames. In this way, texture and color of portions in the supplemented frame may remain consistent.

Optionally, in another embodiment, after the generating an alpha image of each video frame according to an occlusion relationship between each of the multiple video frames and a supplemented video frame of each video frame in a background missing region, the method further includes: performing, according to a boundary of a supplemented region indicated by the occlusion relationship, Gaussian blur by setting an alpha channel value that is greater than 0 and less than 1.

Gaussian blur is performed on the boundary of the supplemented region, so that a visual effect of an image is more close to that in a real scene.

Optionally, in another embodiment, the method further includes: determining a first pixel window in the target video frame, where the first pixel window includes a target pixel, and a width of the first pixel window is greater than a width of two pixels; determining, in multiple pixels in the first pixel window, whether each of the multiple pixels is a foreground pixel or a background pixel, where a depth of the foreground pixel is less than a depth of the background pixel; when a pixel in the multiple pixels that is the foreground pixel is not in the supplemented region, determining the pixel as a pixel in an extended supplemented region, where the extended supplemented region includes the supplemented region; and performing, according to the boundary of the supplemented region indicated by the occlusion relationship, Gaussian blur on the target video frame by setting the alpha channel value that is greater than 0 and less than 1 includes: performing Gaussian blur on a boundary of the extended supplemented region by setting the alpha channel value that is greater than 0 and less than 1.

Figure 3:
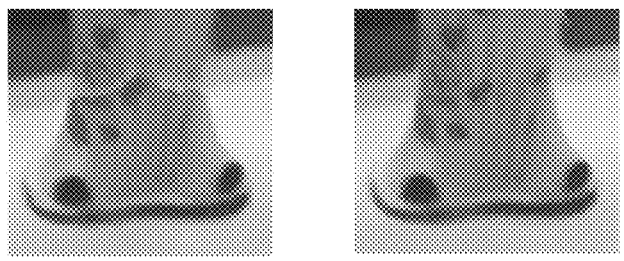
FIG. 3 shows image screenshots before and after mask expansion according to still another embodiment of the present invention.

Specifically, FIG. 3 shows image screenshots before and after mask expansion according to still another embodiment of the present invention. In a left-side diagram in FIG. 3, due to conventional Gaussian blur processing, depth discontinuity occurs in portions that should be contiguous. To resolve the problem, local Gaussian filtering may be performed, to implement mask expansion and form an extended supplemented region. For example, an 11×11 window is selected around each pixel p, and depth differences between all pixels q in the window and the pixel p are calculated to obtain an array $\{|D_p-D_q|\}$, the array is then sorted, an increase of an ascending sequence obtained after sorting is calculated, and truncation is performed at a position with a maximum increase. If the window has both a foreground pixel and a background pixel, because there is a jump in depth, the position with the maximum increase is surely demarcation between the two types of pixels. Therefore, a pixel having a relatively large depth difference from the pixel p (they do not belong to a same layer) may be removed. Statistical collection is performed on mask values of remaining pixels. If there is a pixel whose mask is labeled as a pixel in an occluded region, the pixel p is set to be in the occluded region. Finally, Gaussian filtering is performed on an expanded mask, an 11×11 window is selected as a Gaussian kernel, σ takes a value of 5, and an alpha channel value is set. By sorting the depth differences, a critical pixel may be more accurately determined, thereby more accurately processing an image. In other words, for actual objects whose depths are close, when portions of the actual objects are supplemented due to supplementation processing, discontinuity occurs on the actual objects because of Gaussian blur. By means of Gaussian blur on the extended supplemented region, a visual effect of a position with a maximum depth difference is more close to that in a real scene, and blurring of the portions whose depths are close or are contiguous are not visually perceived.

According to this embodiment of the present invention, the determining, in multiple pixels in the first pixel window, whether each of the multiple pixels is a foreground pixel or a background pixel includes: determining a depth difference between each pixel and the target pixel, to obtain multiple depth differences corresponding to the multiple pixels; sorting the multiple depth differences in ascending order or descending order; determining a depth difference at a position with a maximum increase according to an increase between two adjacent depth differences in a sequence; determining a pixel corresponding to the depth difference at the position with the maximum increase, as a critical pixel between the foreground pixel and the background pixel; and determining whether each pixel is the foreground pixel or the background pixel, where a depth difference corresponding to the foreground pixel is less than a depth difference corresponding to the critical pixel, and a depth difference corresponding to the background pixel is greater than the depth difference corresponding to the critical pixel.

Optionally, in another embodiment, after the obtaining multiple video frames, the method further includes: determining multiple corresponding initial feature pixels in the multiple video frames, where the multiple initial feature pixels are determined according to pixel intensity gradients of the multiple video frames; determining multiple final feature pixels in the multiple initial feature pixels according to a constraint condition, where the constraint condition is that in each video frame, there is a feature pixel in any second pixel window, and a width of the second pixel window is greater than a width of one pixel; and the determining a depth map of each video frame according to corresponding pixels among the multiple video frames includes: determining camera parameters corresponding to each video frame and position information of the multiple final feature pixels according to the multiple final feature pixels; determining depths of multiple final feature pixels in each video frame according to the position information of the multiple final feature pixels and the camera parameters corresponding to each video frame; determining, according to the depths of the multiple final feature pixels in each video frame, a dense depth map of each video frame by means of pixel similarity calculation; performing plane fitting processing on the dense depth map of each video frame; and performing time-space coherence processing on multiple dense depth maps on which the plane fitting processing has been performed, to obtain the multiple depth maps of the multiple video frames.

It should be understood that the width of the second pixel window may be a width of three pixels or greater than a width of three pixels. Because the constraint condition is used, when depth recovery is performed, the amount of calculation is reduced. In addition, the plane fitting processing reduces visual crack caused due to an error in depth, and the time-space coherence processing ensures continuity in depths of a same object in different video frames, time-space coherence is ensured when video frames are continuously played.

In other words, rapid depth recovery is first performed to detect a series of points having distinct features in an image, and then depth recovery is performed on these sparse sampling points, and depths of remaining points are obtained by diffusing depths of the sparse points. "Crack" impact in depth caused by depth diffusion is eliminated by performing plane fitting by using the depths of the sparse points. In addition, time-space coherence of depths is enhanced by means of rapid bundle optimization. Because points requiring calculation are reduced, the amount of calculation is substantially reduced, and data processing is accelerated.

Optionally, in another embodiment, before the determining a depth map of each video frame according to corresponding pixels among the multiple video frames, the method further includes: determining the corresponding pixels among the multiple video frames; determining the camera parameters of each video frame according to the corresponding pixels; creating a spherical coordinate system according to the camera parameters of each video frame and position information of the corresponding pixels among the multiple video frames; obtaining position information of a browsing viewpoint on a surface of a sphere centering on an origin of the spherical coordinate system; and determining the specified browsing angle according to the position information of the browsing viewpoint.

The spherical coordinate system is created, so that during interaction with a user, the user can visually and accurately locate a viewpoint, thereby improving user experience.

According to this embodiment of the present invention, the position information of the corresponding pixels among the multiple video frames three-dimensional coordinates of each of the multiple feature points in the world coordinate system. The creating a spherical coordinate system according to the camera parameters of each video frame and position information of the corresponding pixels among the multiple video frames includes: determining a center window in each of the multiple video frames; determining some of the multiple feature points according to multiple center windows in the multiple video frames and the three-dimensional coordinates of each feature point, where projections of the some feature points on each of the multiple video frames are in the center window in each video frame; averaging multiple three-dimensional coordinates of the some feature points according to each dimension, to obtain coordinates of an origin of the spherical coordinate system; using an average of camera longitudinal directions corresponding to the multiple video frames as a longitudinal axis direction of the spherical coordinate system; using an average of camera image collection angles corresponding to the multiple video frames as an approximately vertical axis direction; using an outer-product vector of an approximately vertical axis direction vector and a longitudinal axis direction vector as a latitudinal axis direction of the spherical coordinate system, and using an outer-product vector of a latitudinal axis direction vector and a longitudinal axis direction vector as a vertical axis direction of the spherical coordinate system.

Figure 4:
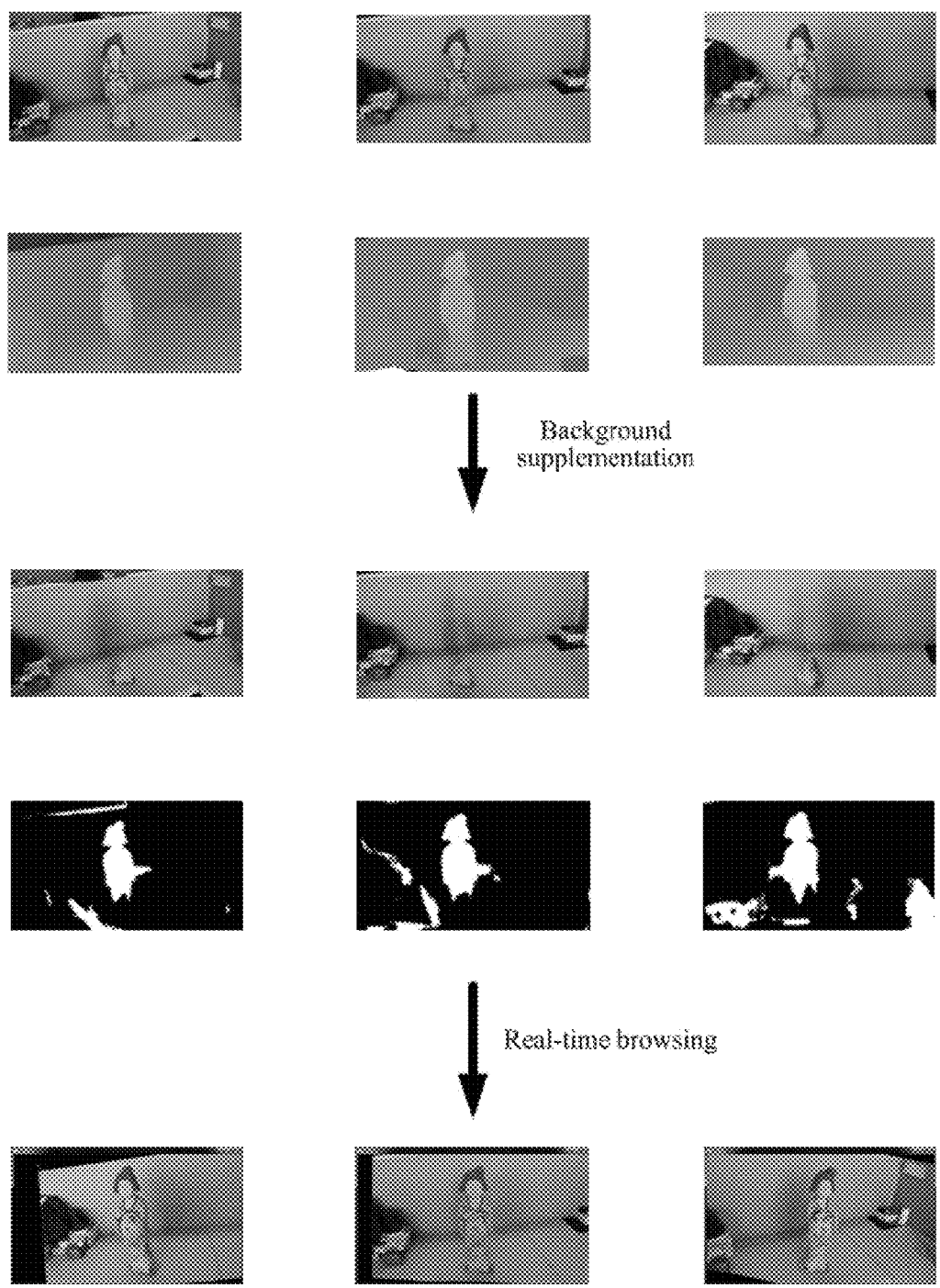
FIG. 4 shows image screenshots in an image processing method according to still another embodiment of the present invention.

FIG. 4 shows image screenshots in an image processing method according to still another embodiment of the present invention. FIG. 4 visually shows an image processing status in each phase of a pre-processing process and a real-time browsing process.

Figure 5:
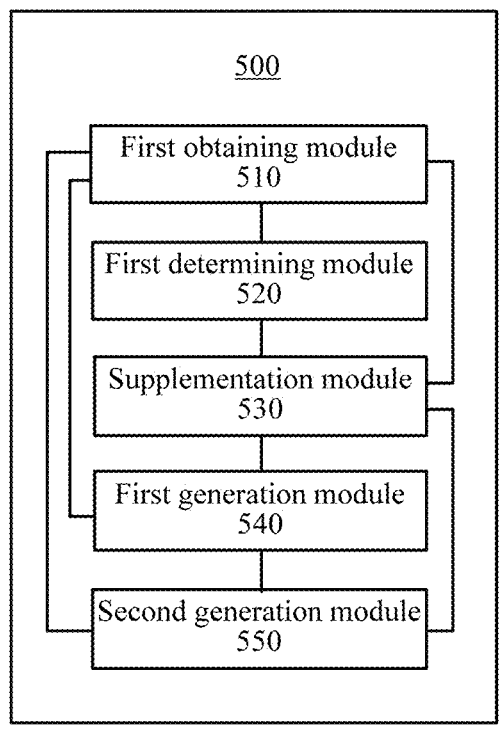
FIG. 5 is a schematic structural diagram of an image processing apparatus according to another embodiment of the present invention.

FIG. 5 is a schematic structural diagram of an image processing apparatus according to another embodiment of the present invention. The image processing apparatus 500 in FIG. 5 corresponds to the method in FIG. 1 and includes: a first obtaining module 510, configured to obtain multiple video frames, where the multiple video frames are collected from a same scene at different angles; a first determining module 520, configured to determine a depth map of each video frame according to corresponding pixels among the multiple video frames; a supplementation module 530, configured to supplement background missing regions of the multiple video frames according to depth maps of the multiple video frames, to obtain supplemented video frames of the multiple video frames and depth maps of the multiple supplemented video frames; a first generation module 540, configured to generate an alpha image of each video frame according to an occlusion relationship between each of the multiple video frames and a supplemented video frame of each video frame in a background missing region; and a second generation module 550, configured to generate a browsing frame at a specified browsing angle according to the multiple video frames, the supplemented video frames of the multiple video frames, and alpha images of the multiple video frames.

It should be understood that the image processing apparatus may be various hardware devices, including a mobile terminal, and terminal devices such as a mobile phone, a tablet computer, a notebook computer, a UMPC (Ultra-mobile Personal Computer, ultra-mobile personal computer), a netbook, and a PDA (Personal Digital Assistant, personal digital assistant).

According to this embodiment of the present invention, a background missing region of a video frame can be supplemented, and then a browsing frame at a specified browsing angle is generated according to a supplemented video frame. Because the video frame image is supplemented before the browsing frame is generated, a speed in image browsing is improved with integrity of a browsed image ensured.

According to this embodiment of the present invention, the second generation module is specifically configured to: obtain position relationships between the browsing angle and collection angles of the multiple video frames; select a target video frame from the multiple video frames according to the position relationships; map pixels in the target video frame and a supplemented video frame of the target video frame to the browsing angle; and blend, by using an alpha image of the target video frame, the pixels mapped to the browsing angle, to generate the browsing frame.

According to this embodiment of the present invention, the second generation module is specifically configured to select the target video frame from the multiple video frames according to the position relationships. In the multiple video frames, a difference between a collection angle of the target video frame and the browsing angle is minimum.

According to this embodiment of the present invention, the supplementation module is specifically configured to: determine a to-be-supplemented frame from the multiple video frames and multiple projected frames of the to-be-supplemented frame, where the to-be-supplemented frame is any one of the multiple video frames, and the multiple projected frames include a background missing region in the to-be-supplemented frame; determine a pixel mapping relationship between a depth map of the to-be-supplemented frame and a depth map of each projected frame; and supplement the to-be-supplemented frame according to multiple pixel mapping relationships by using the multiple projected frames, to obtain a supplemented frame and a depth map of the supplemented frame, where a first pixel in the to-be-supplemented frame corresponds to a second pixel in each projected frame, and when a depth difference between the first pixel and the second pixel is greater than a preset threshold, set pixels in the supplemented frame to a color channel value and a depth channel value of the second pixel, or when a depth difference between the first pixel and the second pixel is not greater than a preset threshold, set pixels in the supplemented frame to a color channel value and a depth channel value of the first pixel, where corresponding pixels between the depth map of the supplemented frame and the supplemented frame have a same depth channel value.

Optionally, in another embodiment, the apparatus further includes: a Gaussian blur module, configured to: after the alpha image of each video frame is generated according to the occlusion relationship between each of the multiple video frames and the supplemented video frame of each video frame in the background missing region, perform, according to a boundary of a supplemented region indicated by the occlusion relationship, Gaussian blur by setting an alpha channel value that is greater than 0 and less than 1.

Optionally, in another embodiment, the apparatus further includes: a second determining module, configured to: determine a first pixel window in the target video frame, where the first pixel window includes a target pixel, and a width of the first pixel window is greater than a width of two pixels; and a third determining module, configured to: determine, in multiple pixels in the first pixel window, whether each of the multiple pixels is a foreground pixel or a background pixel, where a depth of the foreground pixel is less than a depth of the background pixel; and when a pixel in the multiple pixels that is the foreground pixel is not in the supplemented region, determine the pixel as a pixel in an extended supplemented region, where the extended supplemented region includes the supplemented region. The Gaussian blur module is specifically configured to perform Gaussian blur on a boundary of the extended supplemented region by setting the alpha channel value that is greater than 0 and less than 1.

According to this embodiment of the present invention, the third determining module is specifically configured to: determine a depth difference between each pixel and the target pixel, to obtain multiple depth differences corresponding to the multiple pixels; sort the multiple depth differences in ascending order or descending order; determine a depth difference at a position with a maximum increase according to an increase between two adjacent depth differences in a sequence; determine a pixel corresponding to the depth difference at the position with the maximum increase, as a critical pixel between the foreground pixel and the background pixel; and determine whether each pixel is the foreground pixel or the background pixel. A depth difference corresponding to the foreground pixel is less than a depth difference corresponding to the critical pixel, and a depth difference corresponding to the background pixel is greater than the depth difference corresponding to the critical pixel.

Optionally, in another embodiment, the apparatus further includes: a fourth determining module, configured to: after the multiple video frames are obtained, determine multiple corresponding initial feature pixels in the multiple video frames, where the multiple initial feature pixels are determined according to pixel intensity gradients of the multiple video frames; and a fifth determining module, configured to determine multiple final feature pixels in the multiple initial feature pixels according to a constraint condition, where the constraint condition is that in each video frame, there is a feature pixel in any second pixel window, and a width of the second pixel window is greater than a width of one pixel. The first determining module is specifically configured to: determine camera parameters corresponding to each video frame and position information of the multiple final feature pixels according to the multiple final feature pixels; determine depths of multiple final feature pixels in each video frame according to the position information of the multiple final feature pixels and the camera parameters corresponding to each video frame; determine, according to the depths of the multiple final feature pixels in each video frame, a dense depth map of each video frame by means of pixel similarity calculation; perform plane fitting processing on the dense depth map of each video frame; and perform time-space coherence processing on multiple dense depth maps on which the plane fitting processing has been performed, to obtain the multiple depth maps of the multiple video frames.

Optionally, in another embodiment, the apparatus further includes: a sixth determining module, configured to: before the depth map of each video frame is determined according to the corresponding pixels among the multiple video frames, determine the corresponding pixels among the multiple video frames; a seventh determining module, configured to determine the camera parameters of each video frame according to the corresponding pixels; a creation module, configured to create a spherical coordinate system according to the camera parameters of each video frame and position information of the corresponding pixels among the multiple video frames; a second obtaining module, configured to obtain position information of a browsing viewpoint on a surface of a sphere centering on an origin of the spherical coordinate system; and an eighth determining module, configured to determine the specified browsing angle according to the position information of the browsing viewpoint.

For operations performed by the modules in FIG. 5, refer to the method in FIG. 1, and details are not described again herein.

Figure 6:
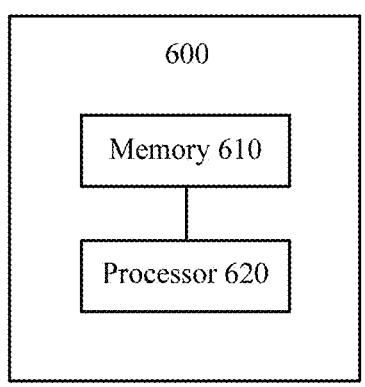
FIG. 6 is a schematic structural diagram of an image processing apparatus according to another embodiment of the present invention.

FIG. 6 is a schematic structural diagram of an image processing apparatus according to another embodiment of the present invention. The image processing apparatus 600 in FIG. 6 corresponds to the method in FIG. 1, and includes: a memory 610, configured to store a program; and a processor 620, configured to execute the program. When the program is executed, the processor 620 is configured to: obtain multiple video frames, where the multiple video frames are collected from a same scene at different angles; determine a depth map of each video frame according to corresponding pixels among the multiple video frames; supplement background missing regions of the multiple video frames according to depth maps of the multiple video frames, to obtain supplemented video frames of the multiple video frames and depth maps of the multiple supplemented video frames; generate an alpha image of each video frame according to an occlusion relationship between each of the multiple video frames and a supplemented video frame of each video frame in a background missing region; and generate a browsing frame at a specified browsing angle according to the multiple video frames, the supplemented video frames of the multiple video frames, and alpha images of the multiple video frames.

According to this embodiment of the present invention, a background missing region of a video frame can be supplemented, and then a browsing frame at a specified browsing angle is generated according to a supplemented video frame. Because the video frame image is supplemented before the browsing frame is generated, a speed in image browsing is improved with integrity of a browsed image ensured.

According to this embodiment of the present invention, the processor is specifically configured to: obtain position relationships between the browsing angle and collection angles of the multiple video frames; select a target video frame from the multiple video frames according to the position relationships; map pixels in the target video frame and a supplemented video frame of the target video frame to the browsing angle; and blend, by using an alpha image of the target video frame, the pixels mapped to the browsing angle, to generate the browsing frame.

According to this embodiment of the present invention, the processor is specifically configured to select the target video frame from the multiple video frames according to the position relationships. In the multiple video frames, a difference between a collection angle of the target video frame and the browsing angle is minimum.

According to this embodiment of the present invention, the processor is specifically configured to: determine a to-be-supplemented frame from the multiple video frames and multiple projected frames of the to-be-supplemented frame, where the to-be-supplemented frame is any one of the multiple video frames, and the multiple projected frames include a background missing region in the to-be-supplemented frame; determine a pixel mapping relationship between a depth map of the to-be-supplemented frame and a depth map of each projected frame; and supplement the to-be-supplemented frame according to multiple pixel mapping relationships by using the multiple projected frames, to obtain a supplemented frame and a depth map of the supplemented frame, where a first pixel in the to-be-supplemented frame corresponds to a second pixel in each projected frame, and when a depth difference between the first pixel and the second pixel is greater than a preset threshold, set pixels in the supplemented frame to a color channel value and a depth channel value of the second pixel, or when a depth difference between the first pixel and the second pixel is not greater than a preset threshold, set pixels in the supplemented frame to a color channel value and a depth channel value of the first pixel, where corresponding pixels between the depth map of the supplemented frame and the supplemented frame have a same depth channel value.

According to this embodiment of the present invention, the processor is further configured to: after generating the alpha image of each video frame according to the occlusion relationship between each of the multiple video frames and the supplemented video frame of each video frame in the background missing region, perform, according to a boundary of a supplemented region indicated by the occlusion relationship, Gaussian blur by setting an alpha channel value that is greater than 0 and less than 1.

According to this embodiment of the present invention, the processor is further configured to: determine a first pixel window in the target video frame, where the first pixel window includes a target pixel, and a width of the first pixel window is greater than a width of two pixels; determine, in multiple pixels in the first pixel window, whether each of the multiple pixels is a foreground pixel or a background pixel, where a depth of the foreground pixel is less than a depth of the background pixel; and when a pixel in the multiple pixels that is the foreground pixel is not in the supplemented region, determine the pixel as a pixel in an extended supplemented region, where the extended supplemented region includes the supplemented region. The processor is specifically configured to perform Gaussian blur on a boundary of the extended supplemented region by setting the alpha channel value that is greater than 0 and less than 1.

According to this embodiment of the present invention, the processor is specifically configured to: determine a depth difference between each pixel and the target pixel, to obtain multiple depth differences corresponding to the multiple pixels; sort the multiple depth differences in ascending order or descending order; determine a depth difference at a position with a maximum increase according to an increase between two adjacent depth differences in a sequence; determine a pixel corresponding to the depth difference at the position with the maximum increase, as a critical pixel between the foreground pixel and the background pixel; and determine whether each pixel is the foreground pixel or the background pixel. A depth difference corresponding to the foreground pixel is less than a depth difference corresponding to the critical pixel, and a depth difference corresponding to the background pixel is greater than the depth difference corresponding to the critical pixel.

According to this embodiment of the present invention, the processor is further configured to: after obtaining the multiple video frames, determine multiple corresponding initial feature pixels in the multiple video frames, where the multiple initial feature pixels are determined according to pixel intensity gradients of the multiple video frames; and determine multiple final feature pixels in the multiple initial feature pixels according to a constraint condition, where the constraint condition is that in each video frame, there is a feature pixel in any second pixel window, and a width of the second pixel window is greater than a width of one pixel. The processor is specifically configured to: determine camera parameters corresponding to each video frame and position information of the multiple final feature pixels according to the multiple final feature pixels; determine depths of multiple final feature pixels in each video frame according to the position information of the multiple final feature pixels and the camera parameters corresponding to each video frame; determine, according to the depths of the multiple final feature pixels in each video frame, a dense depth map of each video frame by means of pixel similarity calculation; perform plane fitting processing on the dense depth map of each video frame; and perform time-space coherence processing on multiple dense depth maps on which the plane fitting processing has been performed, to obtain the multiple depth maps of the multiple video frames.

According to this embodiment of the present invention, the processor is specifically configured to: before determining the depth map of each video frame according to the corresponding pixels among the multiple video frames, determine the corresponding pixels among the multiple video frames; determine the camera parameters of each video frame according to the corresponding pixels; create a spherical coordinate system according to the camera parameters of each video frame and position information of the corresponding pixels among the multiple video frames; obtain position information of a browsing viewpoint on a surface of a sphere centering on an origin of the spherical coordinate system; and determine the specified browsing angle according to the position information of the browsing viewpoint.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present embodiments may be implemented by hardware, firmware or a combination thereof. When the present embodiments are implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation: The computer-readable medium may include a random access memory (RAM), a read only memory (ROM), an electronically erasable programmable read only memory (EEPROM), a compact disc read only memory (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the present embodiments includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what is described above is merely examples of embodiments of the technical solutions of the present embodiments, but is not intended to limit the protection scope of the present embodiments. Any modification, equivalent replacement, or improvement made without departing from the spirit and principle of the present embodiments shall fall within the protection scope of the present embodiments.

What is claimed is:

1. A method comprising:
obtaining, by an image processing apparatus, multiple video frames, wherein the multiple video frames are collected from a same scene at different angles;
determining, by the image processing apparatus, a depth map of the multiple video frames according to corresponding pixels among the multiple video frames;
supplementing, by the image processing apparatus, background missing regions of the multiple video frames according to depth maps of the multiple video frames, to obtain supplemented video frames of the multiple video frames and depth maps of the multiple supplemented video frames;
generating, by the image processing apparatus, alpha images of the multiple video frames according to occlusion relationships between the multiple video frames and supplemented video frames of the multiple video frames in a background missing region, wherein the alpha images of the multiple video frames each comprise alpha values that indicate a portion of the video frame that corresponds to a supplemented portion and that further indicate a portion of the video frame that corresponds to a portion of the video frame other than the supplemented portion; and
generating, by the image processing apparatus, a browsing frame at a browsing angle according to the multiple video frames, the supplemented video frames of the multiple video frames, and the alpha images of the multiple video frames.

2. The method according to claim 1, wherein generating the browsing frame comprises:
obtaining position relationships between the browsing angle and collection angles of the multiple video frames;
selecting a target video frame from the multiple video frames according to the position relationships;
mapping pixels in the target video frame and a supplemented video frame of the target video frame to the browsing angle; and
blending, using an alpha image of the target video frame, the pixels mapped to the browsing angle, to generate the browsing frame.

3. The method according to claim 2, wherein in the multiple video frames, wherein there is a minimum difference between a collection angle of the target video frame and the browsing angle.

4. The method according to claim 2, wherein the generating the alpha images:
determining a first pixel window in the target video frame, wherein the first pixel window comprises a target pixel, and wherein a width of the first pixel window is greater than a width of two pixels;
determining, in multiple pixels in the first pixel window, whether the multiple pixels are foreground pixels or background pixels according to the target pixel, wherein depths of the foreground pixels are less than depths of the background pixels; and
determining a pixel in the multiple pixels as a supplemented region, wherein the pixel in the multiple pixels is not in the supplemented region, wherein the supplemented region comprises the supplemented region; and
performing, according to a boundary of the supplemented region indicated by the occlusion relationships, Gaussian blur on the target video frame by setting the alpha channel value that is greater than 0 and less than 1 by performing Gaussian blur on a boundary of the supplemented region by setting the alpha channel value that is greater than 0 and less than 1.

5. The method according to claim 4, wherein determining whether the multiple pixels are foreground pixels or background pixels comprises:
determining a depth difference between the multiple pixels and the target pixel, to obtain multiple depth differences corresponding to the multiple pixels;
sorting the multiple depth differences in ascending order or in descending order;
determining a depth difference at a position with a maximum increase according to an increase between two adjacent depth differences in the sorted multiple depth differences;
determining a pixel corresponding to the depth difference at a position with a maximum increase as a critical pixel between the foreground pixels and the background pixels; and
determining whether the multiple pixels are foreground pixels or background pixels, wherein a depth difference corresponding to the foreground pixels is less than a depth difference corresponding to the critical pixel, and wherein a depth difference corresponding to the background pixels is greater than the depth difference corresponding to the critical pixel.

6. The method according to claim 1, wherein supplementing the background missing regions of the multiple video frames comprises:
determining a to-be-supplemented frame from the multiple video frames and multiple projected frames of the to-be-supplemented frame, wherein the to-be-supplemented frame is one of the multiple video frames, and wherein the multiple projected frames comprise a background missing region in the to-be-supplemented frame;
determining a pixel mapping relationship between a depth map of the to-be-supplemented frame and a depth map of the multiple projected frames;
supplementing the to-be-supplemented frame according to the pixel mapping relationship by the multiple projected frames, to obtain a supplemented frame and a depth map of the supplemented frame, wherein a first pixel in the to-be-supplemented frame corresponds to a second pixel in the multiple projected frames;
setting pixels in the supplemented frame to a color channel value and a depth channel value of the second pixel, in response to determining that a depth difference between the first pixel and the second pixel is greater than a preset threshold; and
setting pixels in the supplemented frame to a color channel value and a depth channel value of the first pixel, in response to determining that a depth difference between the first pixel and the second pixel is less than or equal to a preset threshold, wherein corresponding pixels between the depth map of the supplemented frame and the supplemented frame have a same depth channel value.

7. The method according to claim 1, wherein the method further comprises:
performing, according to a boundary of a supplemented region indicated by the occlusion relationships, Gaussian blur by setting an alpha channel value that is greater than 0 and less than 1, after generating the alpha images of the video frames.

8. The method according to claim 1, wherein the method further comprises:
   determining multiple corresponding initial feature pixels in the multiple video frames, after obtaining the multiple video frames, wherein the initial feature pixels are determined according to pixel intensity gradients of the multiple video frames; and
   determining multiple final feature pixels in the initial feature pixels according to a constraint condition, wherein the constraint condition is that in the multiple video frames, there are feature pixels in a second pixel windows, and wherein a width of the second pixel window is greater than a width of one pixel; and
   wherein determining the depth map of the multiple video frames comprises:
      determining camera parameters corresponding to the multiple video frames and position information of the multiple final feature pixels according to the multiple final feature pixels;
      determining depths of the multiple final feature pixels in the multiple video frames according to the position information of the multiple final feature pixels and the camera parameters corresponding to the multiple video frames;
      determining, according to the depths of the multiple final feature pixels in the multiple video frames, dense depth maps of the multiple video frames by pixel similarity calculation;
      performing plane fitting processing on the dense depth maps of the multiple video frames; and
      performing time-space coherence processing on multiple dense depth maps on which the plane fitting processing has been performed, to obtain the multiple dense depth maps of the multiple video frames.

9. The method according to claim 1, wherein the method further comprises:
   determining the corresponding pixels among the multiple video frames;
   determining camera parameters of the multiple video frames according to the corresponding pixels;
   creating a spherical coordinate system according to the camera parameters of the multiple video frames and position information of the corresponding pixels among the multiple video frames;
   obtaining position information of a browsing viewpoint on a surface of a sphere centering on an origin of the spherical coordinate system; and
   determining the browsing angle according to the position information of the browsing viewpoint, before determining the depth maps of the multiple video frames.

10. The method of claim 1, wherein alpha values are set to values indicating boundaries a supplemented portion and a portion of the video frame other than the supplemented portion.

11. An image processing apparatus, comprising:
   a processor; and
   a non-transitory computer readable storage medium storing a program for execution by the processor, the program including instructions to:
      obtain multiple video frames, wherein the multiple video frames are collected from a same scene at different angles;
      determine depth maps of the multiple video frames according to corresponding pixels among the multiple video frames;
      supplement background missing regions of the multiple video frames according to depth maps of the multiple video frames, to obtain supplemented video frames of the multiple video frames and depth maps of the multiple supplemented video frames;
      generate alpha images of the multiple video frames according to an occlusion relationship between the multiple video frames and supplemented video frames of the multiple video frames in a background missing region, wherein the alpha images of the multiple video frames each comprise alpha values that indicate a portion of the video frame that corresponds to a supplemented portion and that further indicate a portion of the video frame that corresponds to a portion of the video frame other than the supplemented portion; and
      generate a browsing frame at a browsing angle according to the multiple video frames, the supplemented video frames of the multiple video frames, and the alpha images of the multiple video frames.

12. The image processing apparatus according to claim 11, wherein, the instructions further comprise instructions to:
   obtain position relationships between the browsing angle and collection angles of the multiple video frames;
   select a target video frame from the multiple video frames according to the position relationships;
   map pixels in the target video frame and a supplemented video frame of the target video frame to the browsing angle; and
   blend, using an alpha image of the target video frame, the pixels mapped to the browsing angle, to generate the browsing frame.

13. The image processing apparatus according to claim 12, wherein there is a minimum angle difference between a collection angle of the target video frame and the browsing angle.

14. The image processing apparatus according to claim 12, wherein the instructions further comprise instructions to:
   determine a first pixel window in the target video frame, wherein the first pixel window comprises a target pixel, and wherein a width of the first pixel window is greater than a width of two pixels; and
   determine, in multiple pixels in the first pixel window, whether the multiple pixels are foreground pixels or background pixels according to the target pixel, wherein depths of the foreground pixels are less than depths of the background pixels; and
   determine that a pixel of the multiple pixels is in a supplemented region, wherein the supplemented region comprises the supplemented region, and wherein the pixel in the multiple pixels is not in the supplemented region.

15. The image processing apparatus according to claim 14, wherein, the instructions to determine whether the multiple pixels are foreground pixels or background pixels comprises instructions to:
   determine a depth difference between the multiple pixels and the target pixel, to obtain multiple depth differences corresponding to the multiple pixels;
   sort the multiple depth differences in ascending order or descending order;
   determine a depth difference at a position with a maximum increase according to an increase between two adjacent depth differences in the sorted multiple depth differences;

determine a pixel corresponding to the depth difference at the position with the maximum increase, as a critical pixel between the foreground pixel and the background pixel; and determine whether the multiple pixels are foreground pixels or background pixels, wherein a depth difference corresponding to the foreground pixels is less than a depth difference corresponding to the critical pixel, and wherein a depth difference corresponding to the background pixels is greater than the depth difference corresponding to the critical pixel.

16. The image processing apparatus according to claim 11, wherein, the instructions to supplement the background missing regions comprise instructions to:

determine a to-be-supplemented frame from the multiple video frames and multiple projected frames of the to-be-supplemented frame, wherein the to-be-supplemented frame is one of the multiple video frames, and wherein the multiple projected frames comprise a background missing region in the to-be-supplemented frame;

determine a pixel mapping relationship between a depth map of the to-be-supplemented frame and a depth map of the multiple projected frames;

supplement the to-be-supplemented frame according to multiple pixel mapping relationships using the multiple projected frames, to obtain a supplemented frame and a depth map of the supplemented frame, wherein a first pixel in the to-be-supplemented frame corresponds to a second pixel in the multiple projected frames;

set pixels in the supplemented frame to a color channel value and a depth channel value of the second pixel, in response to determining that a depth difference between the first pixel and the second pixel is greater than a preset threshold; and set pixels in the supplemented frame to a color channel value and a depth channel value of the first pixel, in response to determining that a depth difference between the first pixel and the second pixel is less than or equal to a preset threshold, wherein corresponding pixels between the depth map of the supplemented frame and the supplemented frame have a same depth channel value.

17. The image processing apparatus according to claim 11, the instructions further comprise instructions to:

perform, according to a boundary of a supplemented region indicated by the occlusion relationship, Gaussian blur by setting an alpha channel value that is greater than 0 and less than 1, after the alpha images of the multiple video frames is generated.

18. The image processing apparatus according to claim 11, wherein the instructions further comprise instructions to:

determine multiple corresponding initial feature pixels in the multiple video frames, after the multiple video frames are obtained, wherein the initial feature pixels are determined according to pixel intensity gradients of the multiple video frames; and determine multiple final feature pixels in the initial feature pixels according to a constraint condition, wherein the constraint condition is that in the multiple video frames, there is a feature pixel in a second pixel window, and wherein a width of the second pixel window is greater than a width of one pixel; and wherein the instructions to determine the depth maps of the multiple video frames comprise instructions to:

determine camera parameters corresponding to the multiple video frames and position information of the multiple final feature pixels according to the multiple final feature pixels;

determine depths of multiple final feature pixels in the multiple video frames according to the position information of the multiple final feature pixels and the camera parameters corresponding to each video frame;

determine, according to depths of the multiple final feature pixels in the multiple video frames, dense depth maps of the multiple video frames by pixel similarity calculation;

perform plane fitting processing on the dense depth maps of the multiple video frames; and perform time-space coherence processing on multiple dense depth maps on which the plane fitting processing has been performed, to obtain the multiple dense depth maps of the multiple video frames.

19. The image processing apparatus according to claim 11, wherein the instructions further comprise instructions to:

determine the corresponding pixels among the multiple video frames, before the depth maps of the multiple video frames is determined;

determine camera parameters of the multiple video frames according to the corresponding pixels;

create a spherical coordinate system according to the camera parameters of the multiple video frames and position information of the corresponding pixels among the multiple video frames;

obtain position information of a browsing viewpoint on a surface of a sphere centering on an origin of the spherical coordinate system; and determine the browsing angle according to the position information of the browsing viewpoint.

20. A non-transitory computer readable storage medium storing a program for execution by a processor of an image processing apparatus, the program including instructions to:

obtain multiple video frames, wherein the multiple video frames are collected from a same scene at different angles;

determine depth maps of the multiple video frames according to corresponding pixels among the multiple video frames;

supplement background missing regions of the multiple video frames according to depth maps of the multiple video frames, to obtain supplemented video frames of the multiple video frames and depth maps of the multiple supplemented video frames;

generate alpha images of the multiple video frames according to an occlusion relationship between the multiple video frames and supplemented video frames of the multiple video frames in a background missing region, wherein the alpha images of the multiple video frames each comprise alpha values that indicate a portion of the video frame that corresponds to a supplemented portion and that further indicate a portion of the video frame that corresponds to a portion of the video frame other than the supplemented portion; and generate a browsing frame at a specified browsing angle according to the multiple video frames, the supplemented video frames of the multiple video frames, and the alpha images of the multiple video frames.

* * * * *